July 3, 1956 R. W. SONNENFELDT 2,753,485

SYNCHRONIZED SAWTOOTH WAVE GENERATING CIRCUITS

Filed Dec. 30, 1954 3 Sheets-Sheet 1

INVENTOR.
RICHARD W. SONNENFELDT
BY [signature]
ATTORNEY

SYNCHRONIZED SAWTOOTH WAVE GENERATING CIRCUITS

Filed Dec. 30, 1954 3 Sheets-Sheet 2

INVENTOR.
RICHARD W. SONNENFELDT
BY
[signature]
ATTORNEY

July 3, 1956 R. W. SONNENFELDT 2,753,485

SYNCHRONIZED SAWTOOTH WAVE GENERATING CIRCUITS

Filed Dec. 30, 1954 3 Sheets-Sheet 3

INVENTOR.
RICHARD W. SONNENFELDT
BY
[signature]
ATTORNEY 2,753,485

SYNCHRONIZED SAWTOOTH WAVE GENERATING CIRCUITS

Richard Wolfgang Sonnenfeldt, Haddonfield, N. J., assignor to Radio Corporation of America, a corporation of Delaware Application December 30, 1954, Serial No. 478,740

10 Claims. (Cl. 315—27)

The invention relates to sawtooth wave generating circuits, and it particularly pertains to such circuit arrangements for television receivers which are capable of developing a sawtooth current wave of sufficient amplitude to drive the cathode ray beam deflection windings of a television receiver in response to applied synchronizing pulses.

In present television practice an image is reproduced on the fluorescent screen of a cathode ray tube, or kinescope, by an electron beam which is deflected to trace successive lines forming a raster on the screen. Deflection of the electron beam may be accomplished magnetically or electrostatically. In the magnetic deflection system a sawtooth wave of current is supplied to the windings of a deflection system arranged about the neck of the kinescope. Sawtooth deflection waves, generated by appropriate circuits in the television receiver, are amplified by power amplifier devices and are transferred by means of an output transformer to the deflection system windings.

An object of the invention is to provide a sawtooth current wave generating circuit having an output voltage relatively independent of frenquency of the applied pulse train of synchronizing pulses.

Another object of the invention is to provide a single tube sawtooth current wave generating circuit having a sawtooth current wave output of required magnitude in response to an applied train of synchronizing voltage pulses.

According to the invention a blocking oscillator is constituted by a pentagrid converter tube having an inductor connected between the control and injection electrode to form a tuned circuit resonant at a frequency determined by the inductance of the inductor and the capacitance between the control and injection electrodes. Because a transadmittance having a negative real component appears between these electrodes, the loses of the tuned circuit will be cancelled and oscillations will be produced. A variable resistance element connected between the control electrode and the cathode electrode and a variable capacitance element connected between a tap on the inductor and the cathode electrode have values at which the time constant is long compared to the resonant frequency of the tuned circuit. The oscillator will block in two modes of operation. In the first mode of operation the oscillations build up slowly and die out for a short time, after which the cycle is repeated. In the other mode of operation the oscillations build up very rapidly to a given level, remain at that level for a short time, and then die out for a relatively long interval, after which the cycle is repeated. The mode of oscillation is controlled by the resistance value of the resistance element and the repetition rate is controlled by the capacity of the capacitance element. The circuit arrangement is readily synchronized by applying a train of negative going synchronizing pulses between the cathode electrode and either the control or injection electrodes, preferably through some resistive decoupling element. When used in a television receiver circuit the deflection windings are coupled either directly into the anode electrode circuit of the oscillator according to the invention, or by means of the usual transformer depending upon the characteristics of the electron discharge device used. The inherent capacitive reactance of the transformer and/or the deflection windings bypass R. F. current components so that the current varies along the envelope. The anode cathode current decrease as the oscillations increase and the anode current peak-to-peak variation is a function only of the maximum amplitude of the oscillations and is independent of the blocking frequency.

In order that the practical aspects may be more fully appreciated and the invention more readily put to practical use, an embodiment thereof will be described with reference to the accompanying drawing forming a part of the specification and in which.

Figure 2:
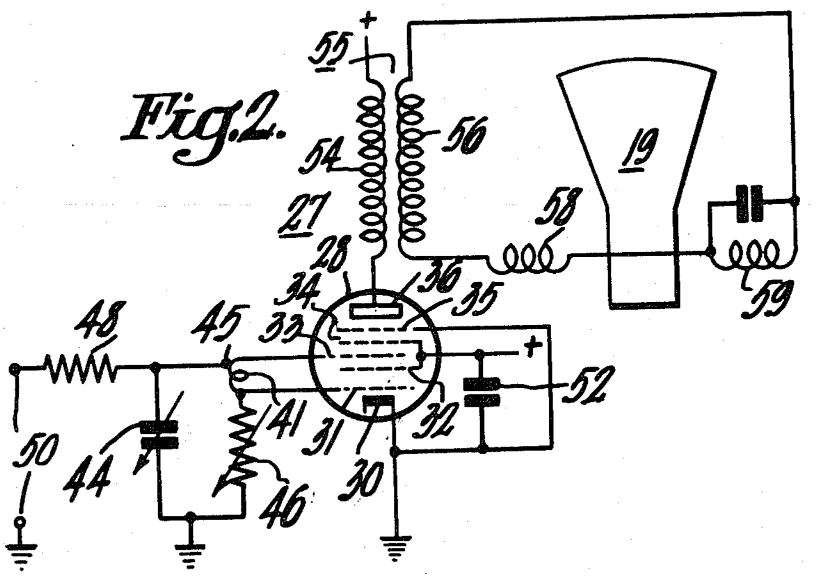
Fig. 2 is a schematic diagram of a sawtooth generating circuit arrangement for one mode of operation according to the invention.
Figure 3:
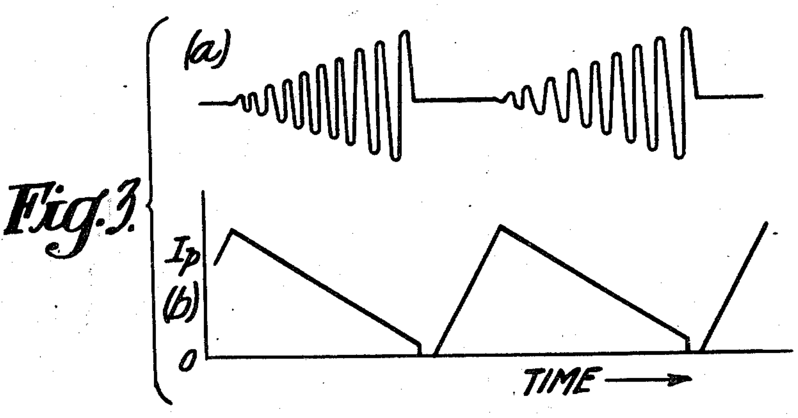
Figure 4:
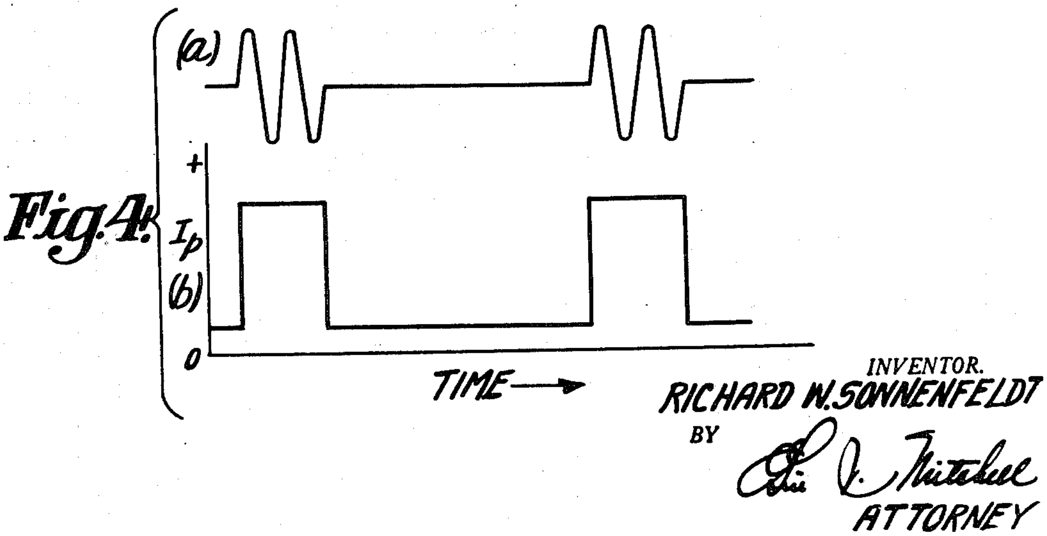
Figure 2A:
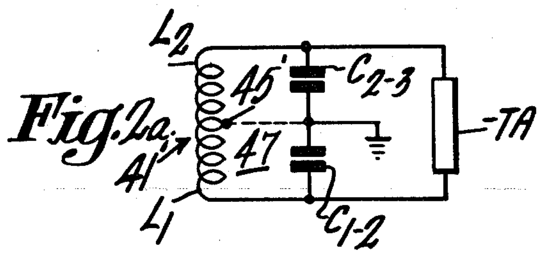
Figure 5:
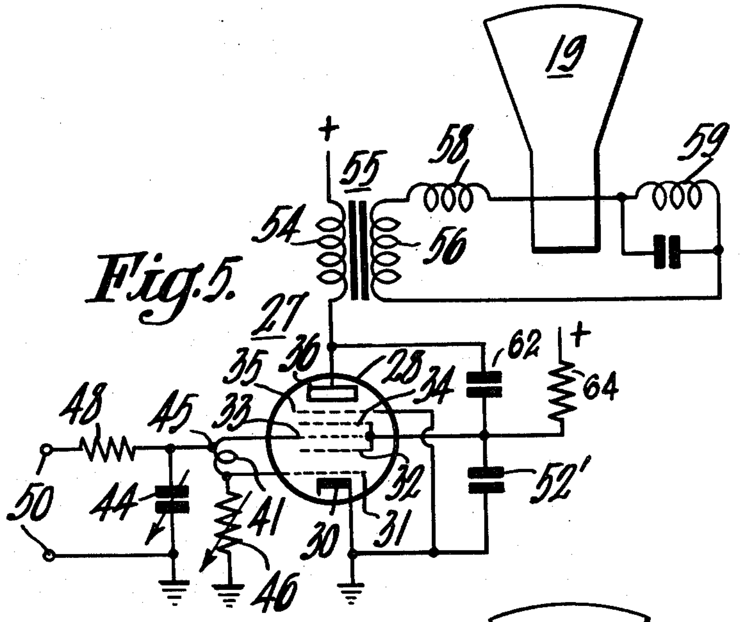
Figure 6:
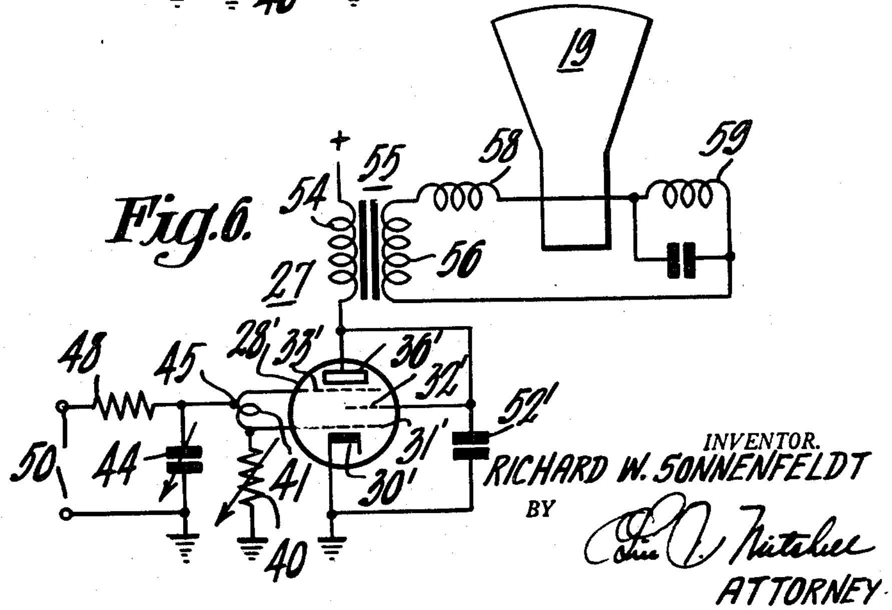

Fig. 2*a* is an equivalent diagram of a portion of the circuitry shown in Fig. 2;

Fig. 3 is a graphical representation of waveforms obtained with the circuit arrangement shown in Fig. 2 in one mode of operation;

Fig. 4 is a graphical representation of waveforms obtained with the circuit arrangement shown in Fig. 2 operating in another mode;

Fig. 5 is a schematic diagram of another embodiment of the invention for the one mode of operation; and Fig. 6 is a further embodiment of the invention.

In Fig. 2 there is shown a schematic diagram of a horizontal deflection wave generating circuit arrangement for use with an externally synchronized oscilloscope or a television receiver or the like. A television receiver, as shown in the functional diagram of Fig. 1 for example, may otherwise comprise circuits which may be entirely conventional and which will be described to illustrate the setting of the invention. In such a receiver television signals appearing at an antenna 11 are applied to a radio frequency wave amplifying circuit 12 and the output therefrom is applied along with a wave obtained from a local beat oscillation generating circuit 13 to a frequency changing circuit 14. The output or the frequency changing circuit 14 is applied to an intermediate frequency (I. F.) amplifier 16, which may be one amplifying both sound and picture signals or, an individual picture I. F. amplifying circuit 16 as shown and to a sound I. F. amplifying circuit 20. A demodulating circuit 17 is coupled to the I. F. amplifying circuit 16 for deriving a video wave from the television signals. The detected video signals are amplified in a video frequency amplifying circuit 18 and thereafter applied to the input circuit of an image reproducing device, or kinescope 19. Sound signals are derived from the frequency changing circuit 14, as shown or from an I. F. amplifying circuit or from the demodulating circuit 17, for further processing in a sound I. F. amplifying circuit 20, an aural signal discriminating circuit 21, an audio frequency amplifying circuit 22 and a transducer 23, usually in the form of a speaker. The output of the video amplifying circuit is also applied to a synchronizing pulse separating circuit 24 to separate the synchronizing pulses from the image information and the vertical synchronizing pulses from the horizontal. The separated vertical synchronizing pulses are applied to a vertical deflection wave generating circuit 25 and the horizontal synchronizing pulses are applied to a horizontal deflection frequency wave generating circuit 27. A high voltage generating circuit 28 may be coupled to the horizontal deflection wave generating circuit 27, and the vertical deflection generating circuit 25, and the horizontal deflection wave generating circuit 27, and the high voltage generating circuit 28 are coupled to the kinescope 19 to furnish the necessary vertical and horizontal deflection waves and second anode, or ultor, potential. A low voltage power supply 29, usually connected to the local A. C. power line, is arranged to furnish direct energizing potentials to all circuits including the horizontal deflection wave generating circuit 27 with the positive pole at the terminals marked with the plus sign and the negative pole at ground. An automatic gain control (A. G. C.) amplifying and distributing network 30 may be coupled to the snychronizing pulse separating circuit 24 as shown, or to the video frequency demodulating circuit 18, to supply control potential to the desired ones of the circuits previously mentioned. Usually the R. F. and the I. F. circuits are at least so supplied.

Referring specifically to the schematic diagram of Fig. 2 the horizontal deflection wave generating circuit 27 according to the invention comprises an electron discharge device in the form of a pentagrid-converter type vacuum tube 28 having a cathode electrode 30, five grid electrodes 31–35, and an anode electrode 36. In this type of tube the first grid 31 is usually designated the control electrode, the second and fourth grids 32, 34 are usually tied together and designated as the screen electrode. The third grid 33 is usually designated the injection electrode, and the fifth grid is usually designated the suppressor electrode; the designations being assigned from the functions more commonly assigned to these grids in the various applications of the tube. In this type of tube a transadmittance having a negative real component appears between the first and third grids 31, 33 as disclosed by E. W. Herold in an article entitled "Operation of frequency converters and mixers for superheterodyne reception" in the Proceedings of the IRE, volume 30, pages 84–102, for February 1942. According to the invention a tuned circuit is formed by an inductor 41 connected between the first and third grids or control and injection electrodes 31, 33 and which is resonant at the frequency determined by the inductance of the inductor 41 and the capacitance between the control and injection electrodes 31, 33. An adjustable capacitance element 44 is connected between a tap 45 on the inductor 41 and the cathode electrode 30.

The location of the tap 45 is not critical, a tolerance of ±30% being acceptable. The location is determined by the interelectrode capacitances as will be seen from an inspection of the equivalent circuit diagram of the tuned circuit as shown in Fig. 2*a*. The screen or second grid is grounded by the capacitor 52 in the circuit of Fig. 1 and the interelectrode capacity represented by the capacitor C1—2 between the first and the second grids in series with that represented by the capacitor C2—3 between the second and third grids forms the tuned circuit 47 in conjunction with the inductance element 41′ having a tap 45′. The negative transadmittance—TA is shown as an element shunting the tuned circuit 47. The first and third grids are arranged to work in push-pull, so that the potential at the ends of the inductance element 41′ are out of phase. The tap 45′ is to be located at a virtual ground point and is therefore near the center but more precisely located so that the proportion $$\frac{L_2}{L_1}=\frac{C_{1-2}}{C_{2-3}}$$

exists. The capacitance element 44, being connected at a virtual ground point therefore does not influence the mode of operation, but controls the blocking rate and an adjustable resistance element 46 is connected between the control electrode 31 and the cathode electrode 30 to control the mode. By means of a decoupling resistor 48 substantially square wave synchronizing pulses of negative polarity are applied at the synchronizing pulse input terminals 50 across the adjustable capacitance element 44. The screen electrode, comprising the interconnected grid electrodes, 32, 33, is bypassed to the cathode 30, by means of a bypass capacitor 52 and the screen electrode is connected directly to a source of positive energizing potential. Positive energizing potential is also applied to the anode electrode 36 through an element, which is inductive at the envelope frequency, which is the same as the recurrence frequency, in the form of the primary winding 54 of an output transformer 55 having a sawtooth current wave output winding 56 to which the deflection system windings 58 and 59 mounted in a yoke arranged about the neck of the kinescope 19 are connected. Conventional high voltage generating circuitry may be coupled to the transformer 55 if desired without adversely affecting the operation of the circuit arrangement according to the invention.

The losses of the tuned circuit comprising the inductor 41 and the capacitance component between the control and injection electrodes 31, 33 are cancelled because of the negative real component of transadmittance so that the circuit arrangement will oscillate freely but the RC time constant of the capacitance and resistance elements 44, 46 is made long as compared to the period, or the reciprocal of the resonant frequency, of the tuned circuit so that the circuit blocks. The blocking repetition rate is controlled by adjustment of the capacitance element 44. When negative synchronizing pulses are applied at the terminals 50, the tube 28 is cut off and the oscillations are blocked, thereby effectively synchronizing the circuit arrangement with the synchronizing pulse train. Variation of the adjustable resistance element 46 causes the circuit arrangement to change between two modes of operation. In one mode of operation, the value of the resistance element 46 is made small and oscillations will gradually build up to a maximum and die out for a short time, after which the cycle is repeated, as shown in Fig. 3(*a*). The anode current of the tube 28 will be essentially sawtooth as shown in Fig. 3(*b*).

The other mode of operation is brought about by adjusting the resistance element 46 to a relatively large value so that the oscillations build up rapidly to a given value, maintain this value for a short time, and then die out for a relatively long interval, after which the cycle is repeated as shown in Fig. 4(*a*). The anode current of the tube 28 oscillator as shown in Fig. 4(*b*) is a pulse current wave.

Carrier bursts occuring at 300 mc. are obtained when an inductor 41 constituted by approximately 1½ inches of wire formed into a single turn loop is used with a type 6BE6 tube. With this arrangement the linearity of the sawtooth current wave can be controlled and locking repetition rates can be varied from a few cycles per minute to megacycles per second using only one variable capacitor for the adjustable capacitance element 44. When operating in the mode illustrated in Fig. 3 the sawtooth output voltage is substantially independent of frequency and the circuit arrangement has considerable more noise immunity than the prior arrangements. The anode current peak-to-peak variation, which decreases as the amplitude of the oscillations increase, is a function of the maximum amplitude of the oscillations, and the sawtooth output wave need not be formed across an integrating capacitor. This is what is done in the prior art arrangements that cause the dependence of the sawtooth wave amplitude on the repetition rate or blocking rate. It is necessary to integrate the pulse current shown in Fig. 4(*b*) obtained with the very large resistance value for the mode controlling element 46 to form a sawtooth voltage wave, as in the prior art, which would be dependent on the recurrence or blocking rate, as well as requiring another tube circuit to convert to a current wave. For this reason the first mode of operation is preferred for magnetic deflection television receivers although, either mode can be used for electrostatic deflection television receivers and oscilloscopes.

Figure 1:
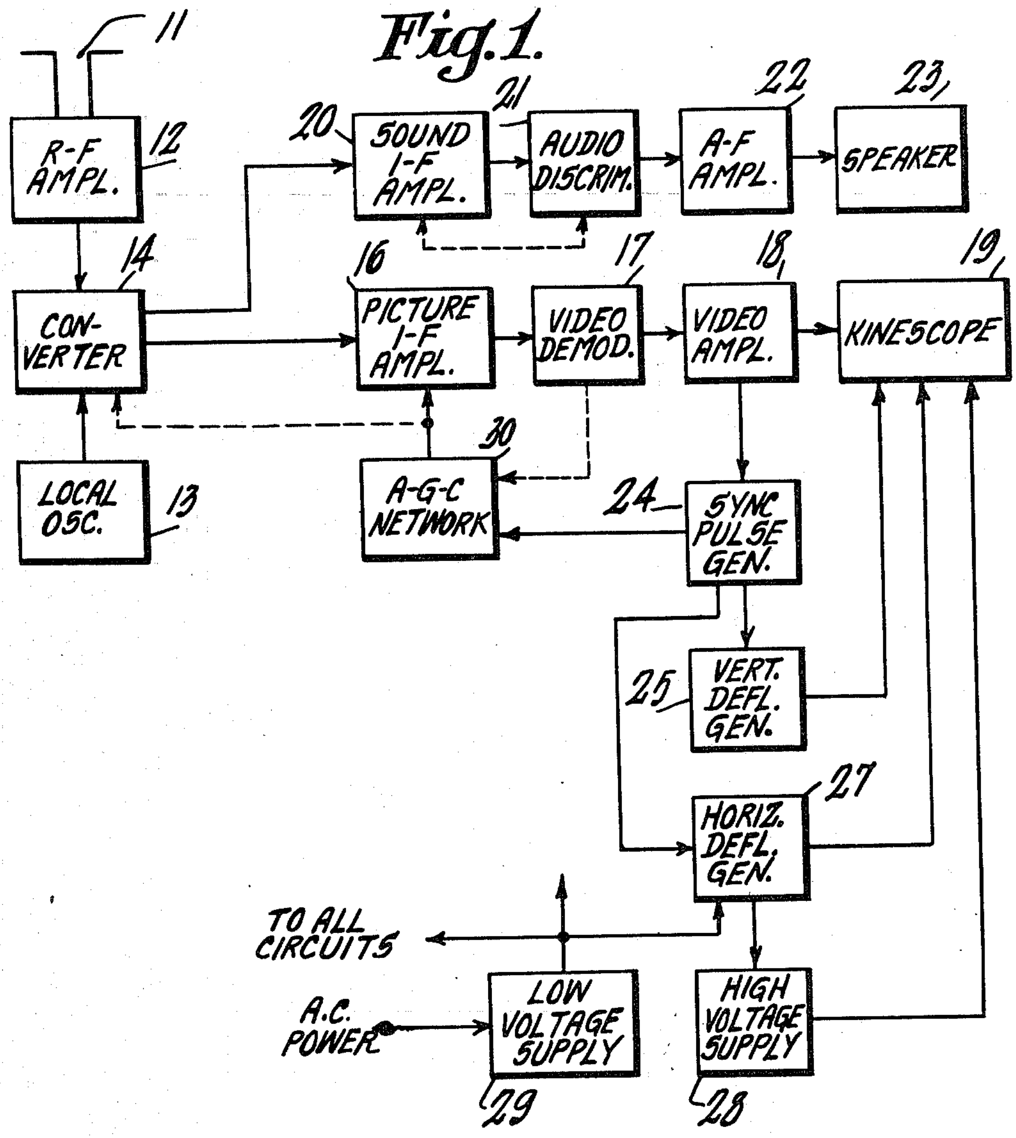
Fig. 1 is a functional diagram of a television receiver incorporating a sawtooth generating circuit according to the invention.

In an embodiment of the invention tested in a television receiver and constructed along the lines shown in Fig. 1 the capacitance element 44 was constituted by a variable capacitor having a value adjustable between 80 and 1200 mmf. and the resistance element 46 at the value adjustable between substantially zero and 1000 kilohms. The load on the anode consisted of kinescope deflection windings of 50 ohms coupled by a conventional television receiver output transformer.

It is contemplated that with a tube 28 of the proper current carrying ability and impedance characteristics the deflection system windings 58, 59 can be connected directly in the anode cathode circuit of the tube 28. Otherwise transformer connections, as shown, may be used.

Where the circumstances dictate the use of circuit components which cause the output wave to be non-linear, the circuit arrangement shown in Fig. 5 may be used to correct the non-linearity. The anode electrode 36 is coupled to the screen electrode by means of a relatively large coupling capacitor 62, which may have a value of the order of 0.001 to 0.5 mf. The screen electrode is energized by way of a dropping resistor 64 having a value sufficiently large as to render a negligible voltage drop across the coupling capacitor 62. Thus the voltage at the anode electrode 36 is also applied to the screen electrode to vary the ratio of screen-to-anode current during the cycle to maintain the anode current rate-of-change substantially constant; that is, to develop a linear sawtooth current wave. The bypass capacitor 52', which is the same as the corresponding capacitor 52 and which may have a value of the order of 10–200 mmf., is just sufficiently large to bypass any carrier burst frequency currents. Extremely good linearity can be obtained with this circuit arrangement.

A circuit arrangement is shown in Fig. 6 in which a pentode vacuum tube 28' of the type having a high suppressor grid gm, such as the type 6AS6, will provide excellent results using the suppressor grid as an injection electrode without otherwise changing the values of the various components.

The invention claimed is:

1. An oscillating circuit arrangement comprising an electron discharge device having a cathode electrode, first, second and third grid electrodes and an anode electrode, there being a negative real component of transadmittance between said first and said third electrodes, an inductance element connected between said first and said third grid electrodes and having an inductance which in conjunction with the capacity between said first and said third electrodes forms a tuned circuit resonant at a relatively high frequency, a resistance element connected between said first grid electrode and said cathode electrode, means to apply energizing potentials to said electrodes of said discharge device to produce oscillations at said high frequency, and a capacitor connected between a point on said inductance element and said cathode electrode to cause said circuit arrangement to block at a substantially periodic rate.

2. An oscillating circuit for producing a sawtooth wave in response to a train of synchronizing pulses, including an electron discharge device having cathode, control, screen injection and anode electrodes, an inductance element connected between said control and said injection electrodes and having an inductance which in conjunction with the inter-electrode capacitance constitutes a tuned circuit resonant to a frequency appreciably higher than that corresponding to the repetition rate of said pulses, a series circuit comprising a resistive element and a capacitance element connected in series and across which said train of synchronizing pulses is applied, a connection between said inductance element and the junction between said resistive and said capacitance element, a resistance element connected between said control and said cathode electrodes, a load element connected to said anode electrode, and means to apply direct energizing potential between said cathode electrode and said screen and anode electrodes.

3. An oscillating circuit for producing a sawtooth wave in response to a train of substantially rectangular synchronizing pulses, including an electron discharge device having cathode, control, screen, injection and anode electrodes, an inductance element connected between said control and said injection electrodes and having an inductance which in conjunction with the inter-electrode capacitance constitutes a tuned circuit resonant to a frequency appreciably higher than the repetition frequency of said pulses, a series circuit comprising a resistive element and a capacitance element connected in series and across which said train of synchronizing pulses is applied, a connection between said inductance element and the junction between said resistive and said capacitance element, a resistance element connected between said control and said cathode electrodes, a load element connected to said anode electrode, a capacitor connected between said screen and anode electrodes, and means to apply direct energizing potential between said cathode electrode and said screen and anode electrodes.

4. An oscillating circuit for producing a sawtooth wave in response to a train of negative going synchronizing pulses, including an electron discharge device having cathode, control, screen, injection and anode electrodes, an inductance element connected between said control and said injection electrodes and having an inductance which in conjunction with the inter-electrode capacitance constitutes a tuned circuit resonant to a frequency appreciably higher than that corresponding to the repetition rate of said pulses, a series circuit comprising a resistive element and a capacitance element connected in series and across which said train of synchronizing pulses is applied, a connection between said inductance element and the junction between said resistive and said capacitance element, a resistance element connected between said control and said cathode electrodes, a load element connected to said anode electrode, and means to apply direct energizing potential between said cathode and anode electrodes, and a connection between said screen and said anode electrodes.

5. An oscillating circuit for producing a sawtooth wave in response to a train of substantially rectangular synchronizing pulses, including an electron discharge device having cathode, control, screen, suppressor and anode electrodes, an inductance element connected between said control and said suppressor electrodes and having an inductance which in conjunction with the inter-electrode capacitance constitutes a tuned circuit resonant to a frequency appreciably higher than the repetition frequency of said pulses, a series circuit comprising a resistive element and a capacitance element connected in series and across which said train of synchronizing pulses is applied, a connection between said inductance element and the junction between said resistive and said capacitance element, a resistance element connected between said control and said cathode electrodes, a load element connected to said anode electrode, and means to apply direct energizing potential between said cathode electrode and said screen and anode electrodes.

6. An oscillating circuit arrangement comprising an electron discharge device having a cathode electrode, first, second and third grid electrodes and an anode electrode, and having a negative real component of transadmittance between said first and said third electrodes, an inductance element connected between said first and said third grid electrodes and having an inductance which in conjunction with the capacity between said first and said third electrodes forms a tuned circuit resonant at a given frequency, a resistance element connected between said first grid electrode and said cathode electrode, means to apply energizing potentials to said electrodes of said discharge device to produce oscillations at said high frequency, and a capacitor connected between a substantially neutral point on said inductance element and said cathode electrode to cause said circuit arrangement to block at a recurrence frequency substantially lower than said given frequency.

7. An oscillating circuit arrangement including, an electron discharge device having at least control, screen and injection electrodes and having a negative real transadmittance component between said control and said injection electrodes, an inductance element connected between said control and said injection electrodes and having an inductance which in conjunction with the interelectrodes capacitance between said control and injection electrodes constitutes a parallel-resonant circuit tuned to a given frequency, and means to apply energizing potential to said electrodes.

8. An oscillating circuit arrangement for producing a sawtooth current wave, including an electron discharge device having cathode, control, screen, injection and anode electrodes and having a negative real transadmittance component between said control and said injection electrodes, an inductance element connected between said control and said injection electrodes and having an inductance which in conjunction with the interelectrode capacitance between said control and injection electrodes constitutes a parallel-resonant circuit tuned to a frequency higher than that of said sawtooth wave, a resistor connected between said control and cathode electrodes, a coupling between said screen and said anode electrodes, a capacitance element connected between said cathode electrode and an intermediate tap on said inductance element, and means to apply energizing potential to said electrodes.

9. An oscillating circuit arrangement for producing a sawtooth current wave in response to a train of synchronizing pulses, including an electron discharge device having cathode, control, screen, injection and anode electrodes and having a negative real transadmittance component between said control and said injection electrodes, an inductance element connected between said control and said injection electrodes and having an inductance which in conjunction with the interelectrode capacitance between said control and injection electrodes constitutes a parallel-resonant circuit tuned to a frequency higher than that of said sawtooth wave, a resistor connected between said control and cathode electrodes, a coupling between said screen and said anode electrodes, a capacitance element connected between said cathode electrode and an intermediate tap on said inductance element, and means including a resistive component to apply said synchronizing pulses across said capacitance element, and means to apply energizing potential to said electrodes.

10. A television receiver having a horizontal synchronizing pulse separating circuit from which a train of negative going synchronizing pulses is derived, a kinescope having a horizontal deflection winding system associated therewith and a horizontal deflection wave generating circuit arrangement coupled between said pulse separating circuit and said deflection winding, said generating circuit arrangement including an electron discharge device having cathode, control, screen, injection and anode electrodes and having a negative real transadmittance component between said control and said injection electrodes, an inductance element connected between said control and said injection electrodes and having an inductance which in conjunction with the interelectrode capacitance between said control and injection electrodes constitutes a parallel-resonant circuit tuned to a frequency higher than that of said deflection wave, a resistor connected between said control and cathode electrodes, a coupling between said screen and said anode electrodes, a capacitance element connected between said cathode electrode and an intermediate tap on said inductance element, and connections to said pulse separating circuit to apply said train of negative going synchronizing pulses across said capacitance element.

References Cited in the file of this patent

UNITED STATES PATENTS 2,231,687 Shepard -------------- Feb. 11, 1941